June 18, 1957     E. UHER     2,795,962
WEDGED-SHAPED BELT VARIABLE DRIVE
Filed Oct. 7, 1954
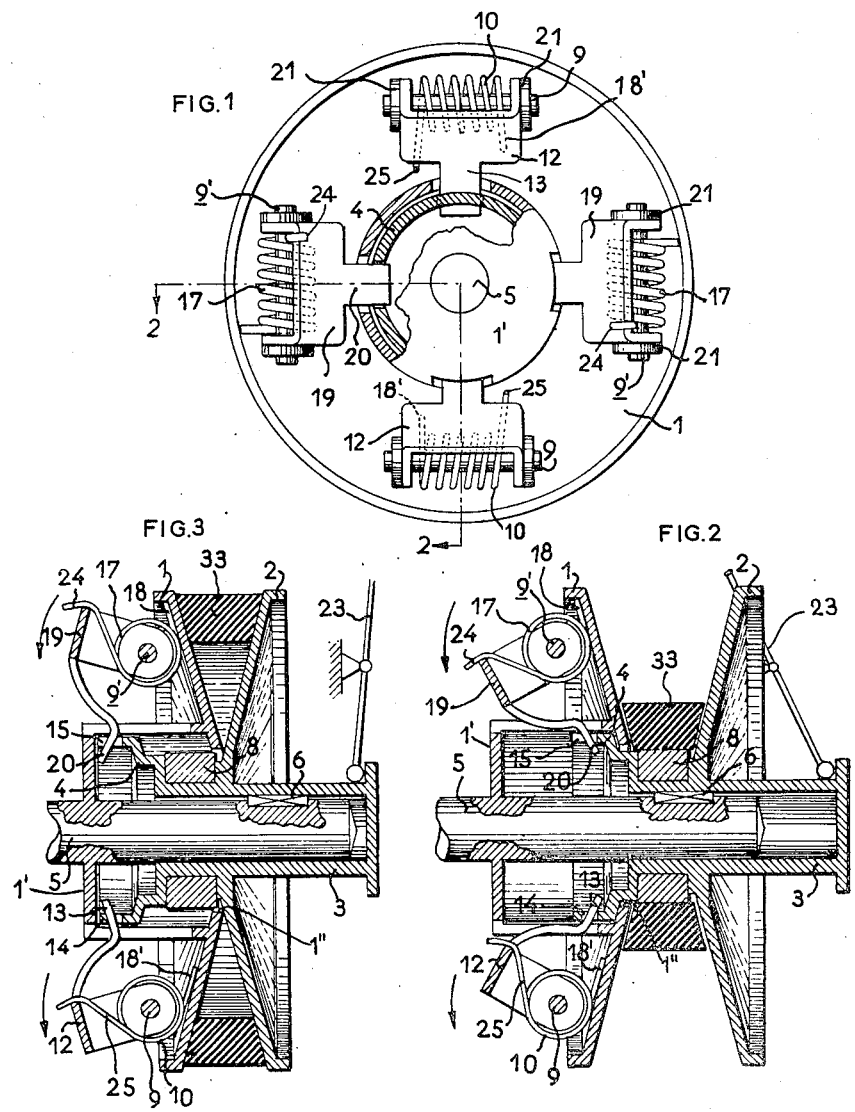
Inventor
E. Uher

United States Patent Office 2,795,962
Patented June 18, 1957

2,795,962
WEDGE-SHAPED BELT VARIABLE DRIVE
Edmond Uher, Cap d'Antibes, France Application October 7, 1954, Serial No. 460,969

Claims priority, application Germany October 8, 1953

6 Claims. (Cl. 74—230.17)

This invention relates to wedge-shaped belt variable drives of the type described in my copending application Serial No. 460,968 filed October 7, 1954, and entitled "Self-Adjusting Wedge-Shaped Belt Variable Drive."

The invention has for its purpose to provide in a variable drive of this type, an automatic clutching action, in response to increase of the speed of rotation of the driving pulley so that, in response to the said increase, the two sections of the driving pulley are automatically urged towards one another to engage the sides of a wedge-shaped or V-belt, whereupon if the speed of rotation of the driving pulley further increases, the driving pulley sections are brought still closer to one another, which determines automatic setting of a ratio of transmission progressively varying from maximum demultiplication to maximum multiplication.

This automatic clutching feature is particularly important when considerable torques are to be transmitted such as by powerful engines, since, in this case, the elastic force required to bring the sections of the driving pulley close to each other is high, so that it becomes impossible to overcome the said force to effect declutching by means of a control lever such as a hand-lever secured e. g. on the steering-wheel.

The main object of the invention is therefore to provide a variable drive of the type described wherein the driving pulley carries between its sections, a freely journalled ring having an outer diameter slightly smaller than the smallest radius of action of the driving pulley on the belt, said ring functioning as a loose pulley when the belt drive is in a declutched condition and wherein the axially movable pulley section is loaded by at least two springs acting thereon in opposite directions, the spring force thus tending to move the said movable section away from the axially fixed section being stronger than the spring force that tends to reduce the space between both sections, the said stronger spring force being controlled by at least one fly-weight that reduces the action of said force on the axially movable section as the speed of rotation of the driving pulley increases.

Other objects and advantages of the invention, will be better understood from the following detailed description with reference to the appended drawing on which has been represented, as a non-limitative illustration, an embodiment of the invention.

In this drawing:

Figure 1 is an end elevational view partly broken away and partly in section illustrating the variable drive in accordance with the invention, as viewed from the side embodying the axially fixed flange, Figure 2 is a sectional view taken along lines 2—2 of Figure 1 illustrating the sections of the driving pulley in their maximum spaced relation and further illustrating the spring means that are rotatable with the pulley, and Figure 3 is a view similar to Figure 2 and illustrating the pulley sections in their closest relative position.

The driving shaft 5 carries the two pulley sections 1 and 2, the section 1 being integral, in the example shown, with shaft 5, while section 2 is axially movable along the shaft 5, and has its hub keyed thereto by a spline 6. The hub of pulley section 2 includes portions 3 and 4 extending on opposite sides of the frusto-conical body of the pulley section 2. The hub portion 4 is a sleeve that is flared out toward the left as shown in the drawings and is disposed through an aperture 1″ in pulley section 1 into a casing 1′ which is integral with shaft 5 and is suitably interconnected with pulley section 1. On the sleeve portion 4 between the flared-out end and the frusto-conical body of pulley section 2 is freely journalled a ring 8 over which the belt 33 runs when the drive is declutched and sections 1 and 2 are in their maximum spaced relation as in Figure 2. In the position of Figure 2 the belt is no longer in frictional engagement or contact with the facing sides of pulley sections 1 and 2. On the outer face of the axially fixed section 1 are diametrically opposed pairs of brackets 21. These brackets support pivot pins 9 and 9′ about which are disposed diametrically disposed pairs of torsion springs 10 and 17 respectively. These springs are of the type that act by spreading their arms, such as are used in clothes-pins, mouse traps and the like. One arm 18 of each of the springs 17 bears on the exterior of the pulley section 1 and is directed toward its perimeter. The other arm 24 of each of springs 17 is bent around and engages a fly-weight 19 swingably disposed about the pivot pins 9′. The arrangement is such that the force exerted by the spreading of the arms 18 and 24 urges fly-weights 19 radially inward of pulley section 1 in the direction of the upper arrows in Figures 2 and 3.

Each fly-weight 19 is provided with an extension 20 which after passing through a slot in casing 1′ bears in the bottom of a notch 15 provided in the edge of the sleeve portion 4. Through the said extensions 20, the axially movable section 2 is urged away from the axially fixed section 1 by the springs 17, so that, at rest, the wedge-shaped belt 33, as shown in Fig. 2, lies over the loose ring 8 without being in frictional contact with sections 1 and 2.

When sections 1 and 2 are rotated, the fly-weights 19 begin to act against the springs 17 and tend to be tilted radially and outwardly, thus progressively decreasing the action of the said springs until, the said action being completely suppressed, there is no longer exerted any axial thrust by springs 17 on the section 2, Figure 3.

The other springs 10 which as stated are diametrically opposed and each of which is mounted between the springs 17 are mounted about pivot pins 9. Each spring 10 includes one arm 18′ bearing against the exterior of pulley section 1 but directed radially inwardly toward the axis thereof. Fly-weights 12 are swingably mounted about pivot pins 9 and the other arm 25 of each spring 10 bears against the inner face of each fly-weight so that the spring force tends to tilt the fly-weights radially outwards. Each fly-weight 12 has an extension 13 which after passing through a slot in casing 1′ is disposed in the hole 14 provided in the flared-out hub portion 4 to thus transmit the pressure exerted by the springs 10 to the hub face at 4 to move the same and thus pulley section 2 axially of shaft 5 in a direction towards pulley section 1. However, since the effective pressure from the set of springs 17 is greater than the effective pressure of the set of springs 10 and operates in opposition thereto, it will be clear that springs 17 will maintain movable pulley section 2 in the position shown in Figure 2 as long as the shaft 5 is either at rest or idle When the sections 1 and 2 are rotated and as their speed of rotation increases, the fly-weights 12 begin to act on the hub portion 4 in the same direction as the springs 10, whereby the movable section 2 is urged towards the axially fixed section 1 with a force progressively increasing as a function of the speed of rotation. The mass of the fly-weights 19 is so selected that for a predetermined speed of rotation of the driving pulley, the said weights are capable of overcoming the elastic force of the springs 17.

With the drive in operation and as the rotational speed increases, the fly-weights 19 will progressively reduce the effective pressure exerted by the springs 17. At the same time fly-weights 12 will assist or augment the force exerted by the springs 10 in moving the hub and thus pulley section 2 towards section 1 to thereby bring the pulley in belt clutching position. The above mentioned progressively increasing resulting action of the springs 10 and fly-weights 12 facilitates outward radial shift of the belt 33, as the speed of rotation increases, said shift increasing the radius of action of the driving pulley on the said belt, and hence reducing the demultiplication through the drive. As the action of the springs 17 is suppressed, at a predetermined speed of rotation, by the fly-weights 19, the above mentioned outward shift of the belt is exclusively controlled by the springs 10 and the fly-weights 12 as a function of the resisting torque. Thus, the action of the centrifugal force has for its effect to reduce to a minimum the time of response of the self-adjusting action of the drive.

As soon as the speed of the engine has been sufficiently reduced to cause automatic declutching, the stronger springs 17, since their associated fly-weights 19 are no longer sufficiently efficient to make them inoperative, begin to act again on the axially movable section to bring the same into its maximum spaced relation with the axially fixed section, as shown in Fig. 2.

It will be understood from the above description that a variable drive according to the invention is capable of meeting all requirements of engine driven vehicles. In particular, it offers the essential advantage of ensuring, upon acceleration of the vehicle engine and the automatic clutching resulting therefrom an immediate setting of the highest demultiplication.

In order to permit, on the one hand, suppression of the automatic clutching process by starting of the vehicle engine, or during the time the engine must be rotated at full rate for heating purposes and, on the other hand, an operator-controlled modification of the ratio of transmission, if desired, there is provided a control lever 23 or the like, by means of which the sleeve portion 4 and, hence, the axially movable section 2 may be shifted axially away from the axially fixed section 1 and held, if desired, in such a position. For this last purpose, the lever 23 may be provided with any suitable locking means. In a two-wheel engine-driven vehicle, the lever 23 may be constituted by a hand-lever mounted on the steering bar of the vehicle, together with a locking device, if desired.

For starting or rotating the engine at full rate, for heating purposes, the said hand-lever is held in locking position. Thus, the action of the fly-weights 12 and 19 is first momentarily suppressed. When the vehicle itself is to be started, the engine is first throttled down, whereupon the hand-lever is unlocked. Thus, the fly-weights are made efficient again, so that as the speed of the engine is increased anew, clutching automatically takes place.

By means of the above mentioned hand-lever, the axially movable section 2 may also be shifted at will during operation of the drive, towards declutched position and held in any desired shifted position to set the drive to a ratio of transmission closer to maximum demultiplication than the ratio to which it would be automatically set. When the hand-lever is released, the automatic self-adjusting action of the device is resumed.

What is claimed is:

1. In a variable speed transmission, a pulley structure comprising a pair of sections the opposed faces of which are of a shape to engage the sides of a V-belt therebetween, a shaft having said pulley sections mounted thereon so that they rotate in unison with said shaft and move axially with respect to each other between a position in which said belt is disengaged from said pulley sections through a belt engaging position in which said pulley sections form a minimum effective pulley diameter, to a position in which said pulley sections form a maximum effective pulley diameter, a first and a second set of centrifugally operated radially movable means for automatically adjusting said pulley sections axially with respect to each other, a first spring pressure means operating on said first set of means urging said pulley sections towards each other, second spring pressure means of greater strength than said first spring pressure means operating on said second set of means urging said pulley sections away from each other, said first set of centrifugal means secured to and rotatable with the pulley operating under centrifugal force to supplement the effective pressure of said first spring pressure means in accordance with increasing speed of rotation, and second centrifugal means secured to and rotatable with the pulley operating under centrifugal force in opposition to said second spring pressure means to reduce the effective pressure thereof in accordance with said increasing speed of rotation, the spring strengths of said first and second spring pressure means being such that said second spring pressure means will maintain said pulley sections in said belt disengaged position as long as said shaft is idling or at rest.

2. The variable speed transmission as claimed in claim 1, in which one of the said pulley sections is axially movable and the other is fixed to said shaft, means pivotally mounting said first and second centrifugal means on said other section for radial swinging movement and said second centrifugal means including extension means bearing on said axially movable section.

3. The variable speed transmission as claimed in claim 2, in which the section fixed to the shaft has an aperture therein, said axially movable section has a sleeve integral therewith passing through the aperture in said fixed section, said sleeve having notches therein extending longitudinally of the shaft and the extension of the second centrifugal means bears in the bottom of the respective notches.

4. The variable speed transmission as claimed in claim 1, in which both said first and second spring pressure means include a set of springs mounted around the pulley in equi-spaced relation and a spring of each set is interposed between two springs of the other set.

5. The variable speed transmission as claimed in claim 1 in which only one section is axially movable along the shaft and has an auxiliary manual control member operably associated with said movable pulley section to move the same against the action of said first mentioned spring pressure means whereby an operator may at will manually control the position of said axially movable section.

6. In a variable speed transmission of the V-belt type, a shaft, a pulley structure comprising a pair of frustoconical bodies disposed to receive the belt therebetween, means fixing one of said bodies on the shaft, said one body having a central aperture therein, apertured hub means for the other body mounting the same on the shaft for axial movement relative to said one body, said hub means including sleeve portions extending on opposite sides of the said other body and one of said sleeve portions passing through said aperture in the said one body, a first and a second set of circumferentially and equi-spaced fly-weights mounted on the face of said one body remote from said other body for radial swinging movement toward and away from said shaft, a first set of spring pressure means operatively associated with said first set of fly-weights urging the associated fly-weights radially outwards, a second set of spring pressure means of greater strength than the first spring pressure means associated with said second set of fly-weights and urging the same radially inwards, each associated fly-weight of said pressure means of the second set being disposed between two associated fly-weights and spring pressure means of said first set, each fly-weight having an extension thereon extending radially inward toward the shaft and each extension being operably associated with said one sleeve portion of the hub means, the extensions of said first set of fly-weights operatively associated with said first spring means being operably associated with the said one sleeve portion to transmit axial movement thereto in a direction to move the bodies together and the extensions on said second set of fly-weights operably associated with said second set of spring pressure means being operably associated with the said one sleeve portion to move the same in a direction to move the bodies apart whereby said first set of fly-weights associated with the first set of spring pressure means supplements the effective pressure thereof in accordance with the increasing speed of rotation and said second set of fly-weights associated with said second spring pressure means operate in opposition to the effective pressure of said second spring pressure means to reduce the effective pressure thereof in accordance with the increased speed of rotation said second set of spring pressure means being of such a strength as to maintain the bodies apart and in belt disengaged position so long as the shaft is at rest or rotating below a predetermined speed of rotation.

References Cited in the file of this patent

UNITED STATES PATENTS

| | | |
|---|---|---|
| 2,294,777 | Heyer | Sept. 1, 1942 |
| 2,553,505 | Miner | May 15, 1951 |

FOREIGN PATENTS

| | | |
|---|---|---|
| 435,257 | Great Britain | Sept. 18, 1935 |